United States Patent [19]

Kasuya

[11] Patent Number: 4,471,615
[45] Date of Patent: Sep. 18, 1984

[54] TURBO AND INERTIA SUPERCHARGER

[75] Inventor: Tamotsu Kasuya, Oyama, Japan

[73] Assignee: Kabushiki Kaisha Komatsu Seisakusho, Tokyo, Japan

[21] Appl. No.: 400,694

[22] Filed: Jul. 22, 1982

[30] Foreign Application Priority Data

Jul. 31, 1981 [JP] Japan .................. 56-112890[U]
Jul. 31, 1981 [JP] Japan .................. 56-112891[U]
Aug. 17, 1981 [JP] Japan .................. 56-120982[U]

[51] Int. Cl.³ ............................................ F02B 37/00
[52] U.S. Cl. .................................. 60/605; 123/52 M
[58] Field of Search .............. 60/598, 605; 123/52 M

[56] References Cited

U.S. PATENT DOCUMENTS 3,796,048  3/1974  Annus et al. ...................... 60/605
4,064,696  12/1977  Cser ........................... 123/52 M X
4,111,163  9/1978  Ederer et al. ................... 123/52 M
4,300,488  11/1981  Cser .............................. 123/52 M

FOREIGN PATENT DOCUMENTS 57-7774   2/1982  Japan ........................... 123/52 M
57-63919  4/1982  Japan ........................... 123/52 M Primary Examiner—Michael Koczo
Attorney, Agent, or Firm—Armstrong, Nikaido, Marmelstein & Kubovcik

[57] ABSTRACT

A combination of turbo and inertia supercharger for an internal combustion engine. A blower of a turbosupercharger is connected with a damping volume such as a surge tank for supplying compressed air thereto. A plurality of elongated intake pipes are provided for connecting the damping volume with intake ports formed in a cylinder head. As a result, an increased supercharging effect can be obtained compared with a turbosupercharger alone. In a preferred embodiment, the elongated intake pipes are made spiral form saving spaces for installation.

1 Claim, 7 Drawing Figures

4,471,615

TURBO AND INERTIA SUPERCHARGER

BACKGROUND OF THE INVENTION

This invention relates to a turbo and inertia supercharger for supercharging the air supplied into engines by turbosupercharging and inertia supercharging in combination.

In general, the turbosuperchargers mounted on the internal combustion engines have volumetric efficiencies in the order of about 50 to 54%. If an attempt is made to increase the volumetric efficiency above such a level, the rate of fuel consumption will increase and the cylinder pressure will increase thereby causing a deterioration in the performance of the engine. For this reason, in the past, the supercharging efficiency has been increased by utilizing either a large-sized supercharger or a multi-stage turbosupercharger system comprised of a plurality of turbosuperchargers. However, the former system is disadvantageous in that the acceleration characteristics of the engine will become worse, whilst the latter system is also disadvantageous in that provision of a plurality of turbosuperchargers is necessary thus increasing the cost of the supercharger system.

SUMMARY OF THE INVENTION

It is therefore an object of the present invention to provide an improved supercharger for an internal combustion engine, which supercharger is comprised of a turbosupercharger and an inertia supercharger.

Another object of the present invention is to provide a combination of turbo and inertia supercharger for an internal combustion engine which can significantly improve supercharging efficiency of the engine.

A further object of the present invention is to provide a combination of turbo and inertia supercharger for an internal combustion engine in which supercharging efficiency in low and middle speeds range can be significantly improved by employing cams each having a profile to change opening and closing timing of intake valves.

In accordance with an aspect of the present invention, there is provided a turbo and inertia supercharger for an internal combustion engine, comprising: a cylinder head of the engine, said cylinder head having formed therein a plurality of intake ports and exhaust ports; a turbosupercharger including a turbine and a blower; first pipe means for communicating the exhaust ports with said turbine; means for forming damping volume; second pipe means for communicating said blower with said damping volume means; and third pipe means for communicating said damping volume means with the respective intake ports.

In a preferred embodiment, the damping volume means is comprised of a surge tank and the third pipe means comprises a plurality of spiral pipes each mounted around an inner periphery of the surge tank and having one end open within the surge tank and the other end protruding out of the surge tank and connected to the respective intake ports of the cylinder head.

The above and other objects, features and advantages of the present invention will be readily apparent from the following description taken in conjunction with the accompanying drawings.

DESCRIPTION OF THE PREFERRED EMBODIMENTS

Figure 2:
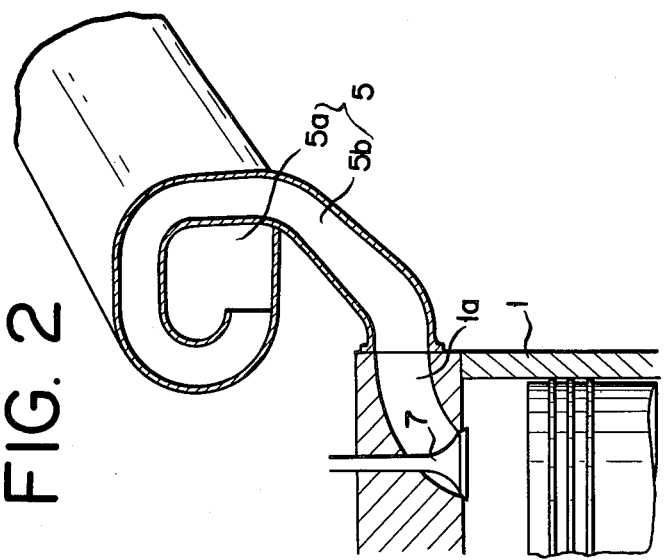
FIG. 2 is a sectional view taken along the line II—II of FIG. 1.
Figure 1:
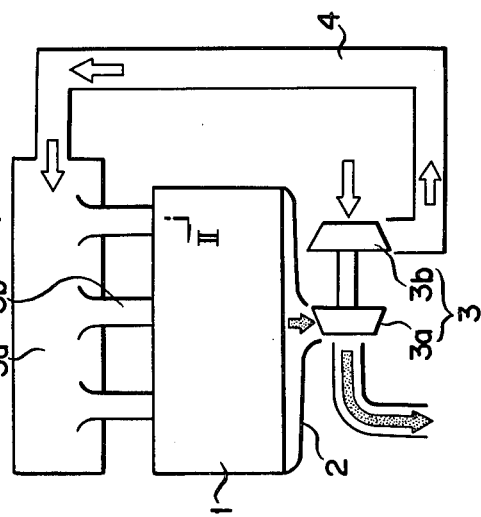
FIG. 1 is schematic plan view explanatory of an overall arrangement of a supercharger according to the present invention.

The present invention will now be described in detail below with reference to the accompanying drawings. In the drawings, reference numeral 1 denotes an internal combustion engine such as a diesel engine, the exhaust pipes 2 of which are connected to a turbine 3a of a turbosupercharger 3. The turbosupercharger 3 comprises the above-mentioned turbine 3a and a blower 3b directly connected to the turbine 3a and driven thereby. The air pressurized by the blower 3b is supplied into a damping volume or surge tank 5a of an inertia supercharger 5. The inertia supercharger 5 comprises the above-mentioned damping volume 5a and intake pipes 5b connecting the damping volume 5a with respective air intake ports 1a. Each of the intake pipes 5b is wound approximately three quarters of the inner periphery of the damping volume 5a. One end of each of the intake pipes 5b opens into the damping volume 5a, and the other end thereof is connected to the intake port 1a as shown in FIG. 2 so that the pressurized air supplied into the damping volume 5a may flow into the intake port 1a of the engine 1 while it is being supercharged by inertia.

Figure 3:
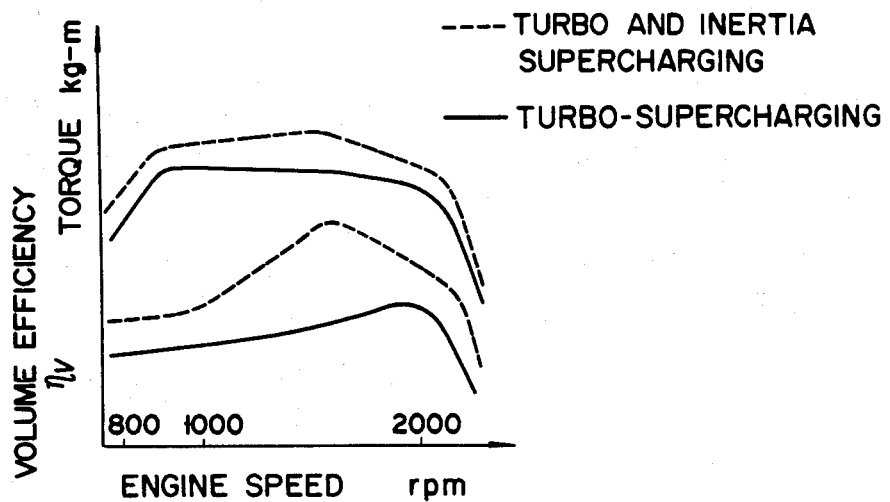
FIG. 3 is a graph showing supercharging efficiencies of a turbo and inertia supercharger of the present invention and a conventional turbosupercharger.

According to the above-mentioned embodiment of the present invention, the arrangement is made such that the air under pressure delivered by the blower 3b of the turbosupercharger 3 is further supercharged by inertia by means of the inertia-supercharger 5 and then supplied into the engine 1. Therefore, as can be seen from FIG. 3, as compared with the prior art system of supercharging the air only by means of a turbosupercharger as shown with a solid line, the volumetric efficiency obtainable by the system of the present invention can be increased by about 10 to 20% at the tuning point as shown with a dotted line thereby enabling an improved supercharging efficiency to be obtained, and also the torque developed thereby can be increased remarkably in the range of high engine speeds. Further, because the arrangement is made such that the intake pipes 5b of the inertia-supercharger 5 extend around the inner periphery of the damping volume 5a thereby enabling required lengths of the pipes to be secured without increasing the overall dimension of the inertia supercharger, the supercharging efficiency in the middle speeds range can be improved and the supercharger itself can be mounted easily on the engine 1.

According to the above-mentioned embodiment, however, improvements in the volumetric efficiency and torque at the tuning point of intake pipes, namely, in the comparatively high speeds range of the engine can be obtained, but those in the low speeds range do not exhibit remarkable improvements. As a result of various experiments, the inventor of the present invention found out that some deviations of opening and shutting positions of the intake valves 7 provide remarkable increases in the volumetric efficiency and torque of the engine in the low speeds range thereof.

Figure 4A:
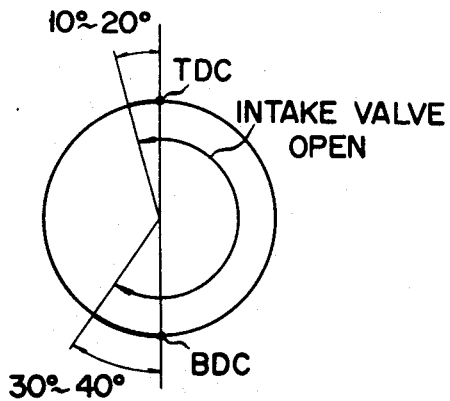
FIG. 4A is a view explanatory of intake valve timing of a typical conventional engine.
Figure 4B:
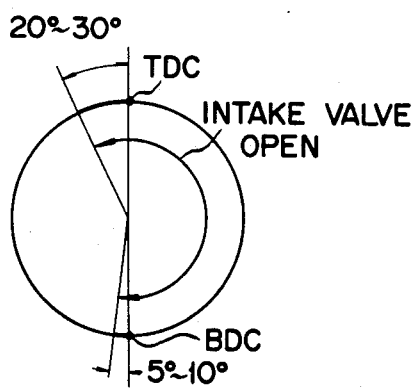
FIG. 4B is similar to FIG. 4A but showing intake valve timing of an engine according to one of the embodiments of the present invention.

Stating in brief, improvements in the volumetric efficiency and torque of the engine in the low speeds range can be achieved by designing the profile of low speed cams adapted to open and shut the intake valves 7 located in the openings of the air intake ports 1a so that the opening of the intake valves 7 occurs 20° to 30° (10° to 20° in the ordinary engine) prior to the top dead center (TDC) and the closing of them occurs 5° to 10° (30° to 40° in the ordinary engine) after the bottom dead center (BRD). FIG. 4A shows the timing of opening and closing of the intake valves of an ordinary engine, whilst FIG. 4B shows that of the intake valves 7 caused by the above-mentioned low speed cams 7 employed in the present invention.

Figure 5A:
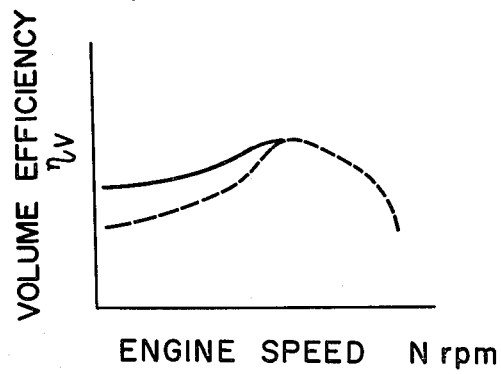
FIG. 5A is a graph showing volumetric efficiencies of superchargers of the present invention in which the broken line indicates an engine having a conventional intake valve timing and the solid line represents an engine having a varied intake valve timing.
Figure 5B:
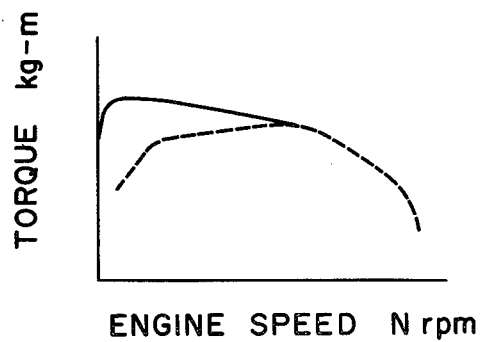
FIG. 5B is similar to FIG. 5A but showing how engine torque is varied relative to engine speed.

By designing the low speed cam's profile in such a configuration and employing the turbo and inertia supercharging system for improving the volumetric efficiency at the tuning points of the intake pipes 5 and the low speed cams in combination so that the opening and closing of the intake valves 7 occur earlier than those of the ordinary engine, the volumetric efficiency in the range of low and medium speeds can be increased as shown by a solid line in FIG. 5A, and the torque can be increased as shown by a solid line in FIG. 5B.

Therefore, the employment of this turbo and inertia supercharger in the engines of construction vehicles which are frequently operated in the low speeds range enables a remarkable improvement in the performance of the engines to be achieved. Further, because it is only necessary to mount the low speed cams having a particular cam profile in this system, the present invention can be applied to turbo and inertia superchargers in service readily and inexpensively.

It is to be understood that the foregoing description is merely illustrative of preferred embodiments of the invention, and that the scope of the invention is not to be limited thereto, but is to be determined by the scope of the appended claims.

What is claimed is:

1. A turbo and inertia supercharger for an internal combustion engine, comprising:

a cylinder head of the engine, said cylinder head having formed therein a plurality of intake ports and exhaust ports;

a turbosupercharger including a turbine and a blower;

first pipe means for communicating the exhaust ports with said turbine;

means for forming a damping volume;

second pipe means for communicating said blower with said damping volume means; and third pipe means for communicating said damping volume means with the respective intake ports, said damping volume means being a surge tank and said third pipe means comprising a plurality of spiral pipes each mounted around an inner periphery of said surge tank and having one end open within said surge tank and the other end protruding out of said surge tank and connected to the respective intake ports of said cylinder head; and a plurality of intake valves each mounted in the respective intake ports and and a plurality of cam means each operatively connected with said respective intake valves for opening and closing the respective intake ports, each of said cam means having a profile such that each intake valve opens 20 to 30 degrees prior to the top dead center and closes 5 to 10 degrees after the bottom dead center.

* * * * *